(12) United States Patent
Seki

(10) Patent No.: US 11,169,395 B2
(45) Date of Patent: Nov. 9, 2021

(54) FRAME FOR BIFOCAL EYEGLASSES

(71) Applicant: Norio Seki, Shizuoka (JP)

(72) Inventor: Norio Seki, Shizuoka (JP)

( * ) Notice: Subject to any disclaimer, the term of this patent is extended or adjusted under 35 U.S.C. 154(b) by 407 days.

(21) Appl. No.: 16/338,774

(22) PCT Filed: Aug. 23, 2017

(86) PCT No.: PCT/JP2017/030074
§ 371 (c)(1),
(2) Date: Apr. 2, 2019

(87) PCT Pub. No.: WO2018/066245
PCT Pub. Date: Apr. 12, 2018

(65) Prior Publication Data
US 2021/0271106 A1    Sep. 2, 2021

(30) Foreign Application Priority Data

Oct. 3, 2016   (JP) .............................. JP2016-195580
Oct. 27, 2016  (JP) .............................. JP2016-210161

(51) Int. Cl.
*G02C 3/00*        (2006.01)
*G02C 5/04*        (2006.01)
(Continued)

(52) U.S. Cl.
CPC ............. *G02C 3/003* (2013.01); *G02C 3/02* (2013.01); *G02C 5/04* (2013.01); *G02C 5/12* (2013.01); *G02C 7/06* (2013.01); *G02C 2200/18* (2013.01)

(58) Field of Classification Search
CPC . G02C 3/003; G02C 5/12; G02C 5/04; G02C 3/02; G02C 7/06; G02C 2200/18
See application file for complete search history.

(56) References Cited

U.S. PATENT DOCUMENTS 2,574,766 A    11/1951  Stegeman
3,425,773 A *   2/1969  Masucci ................ G02C 5/124
                                                 351/55
(Continued)

FOREIGN PATENT DOCUMENTS

CN       1243966 A    2/2000
CN       2496047 Y    6/2002
(Continued)

OTHER PUBLICATIONS

Chinese Office Action for Chinese Application No. 201780061441.4 dated Dec. 11, 2019 with English translation (16 pages).
(Continued)

*Primary Examiner* — Tuyen Tra
(74) *Attorney, Agent, or Firm* — Harness, Dickey & Pierce, P.L.C.

(57) ABSTRACT

A frame includes: a pair of temples; a connecting bar connecting respective ends of the pair of temples; at least one hanging shaft located at a middle of the connecting bar; nose pads fixed to the hanging shaft; a slide attached to the hanging shaft for a sliding movement; a pair of lens-holding frames vertically slidable in front of the connecting bar, the lens-holding frames being each configured to hold vertically arranged upper and lower lenses; and a bridge coupling the lens-holding frames. The bridge is attached at a level lower than a center of the lower lens in each of the lens-holding frames, and the lens-holding frames are slidable for a distance at least corresponding to a distance between a center of the upper lens and the center of the lower lens.

19 Claims, 16 Drawing Sheets

(51) Int. Cl.
*G02C 3/02* (2006.01)
*G02C 5/12* (2006.01)
*G02C 7/06* (2006.01)

(56) References Cited

U.S. PATENT DOCUMENTS

| | | | |
|---|---|---|---|
| 3,698,801 A | 10/1972 | Masucci | |
| 3,770,343 A * | 11/1973 | Masucci | G02C 5/124 351/55 |
| 6,779,886 B2 * | 8/2004 | Huang | G02C 9/00 351/47 |
| 7,325,922 B2 * | 2/2008 | Spivey | G02C 7/02 351/159.04 |
| 10,067,359 B1 * | 9/2018 | Ushakov | G02B 27/0176 |
| 2015/0092153 A1 | 4/2015 | Smith | |

FOREIGN PATENT DOCUMENTS

| | | |
|---|---|---|
| CN | 1356578 A | 7/2002 |
| CN | 2501073 Y | 7/2002 |
| CN | 200959055 Y | 10/2007 |
| CN | 202837703 U | 3/2013 |
| CN | 203069896 U | 7/2013 |
| GB | 1042133 A | 9/1966 |
| JP | S56-052721 U | 5/1981 |
| JP | H07-159733 A | 6/1995 |
| JP | H07-199126 A | 8/1995 |
| JP | H07-261128 A | 10/1995 |
| JP | 3031992 U | 12/1996 |
| JP | 2001-142031 A | 5/2001 |
| JP | 2002-539493 A | 11/2002 |
| JP | 2007-148029 A | 6/2007 |
| JP | 2009-003335 A | 1/2009 |
| JP | 2010-102025 A | 5/2010 |
| JP | 2012-502318 A | 1/2012 |
| JP | 2014-085363 A | 5/2014 |
| TW | 452668 B | 9/2001 |

OTHER PUBLICATIONS

Korean Notice of Allowance with partial translation dated Oct. 12, 2020 (2 pages).
Partial Supplementary European Search Report for Application No. 17858085.8 dated May 13, 2020 (13 pages).

* cited by examiner

FRAME FOR BIFOCAL EYEGLASSES

The entire disclosures of Japanese Patent Application Nos. 2016-210161, filed on Oct. 27, 2016 and 2016-195580, filed on Oct. 3, 2016 are expressly incorporated by reference herein.

BACKGROUND

Technical Field

The present invention relates to a bifocal-glasses frame capable of switching different types of lenses in accordance with an intended use thereof.

Related Art

In a typical pair of bifocal glasses, an upper side of each lens is used for a long-distance vision and a lower side of each lens is used for a short-distance vision. A user wearing the typical glasses changes an eye direction or a view angle; specifically, the user looks upward at a distant object, whereas the user looks downward at a nearby object. With such glasses, the user looks at the object with eyes directed downward from a horizontal level as shown in FIG. 16A. In particular, the user is forced to look at a nearby object in an unnatural eye direction, although it is natural for the user to look squarely (horizontally) at the object (i.e., the user looks at the object with an eye level being aligned with the center of each lens). Such an unnatural manner of looking would tire the user, frequently causing eyestrain.

In order to solve this problem, there have been made many proposals for setting the lower portion of each lens, which is intended for the short-distance vision, closer to the eye level to allow the user to look at the object in an eye direction similar to a normal-vision direction (horizontal direction). According to some of these proposals, only the nose pads are vertically moved so that the user looks at an object in a downward eye direction with respect to the horizontal level as shown in FIG. 16B. The user can thus look at the object at a level closer to the eye level with a less downward displacement of the line of sight as compared with if the user used lenses shown in FIG. 16C. However, since the entire lenses are tilted as shown in the figures, the user looks at the object with difficulty, often suffering from eyestrain.

In addition, a variety of glasses have also been proposed that include invertible glasses and glasses with nose pads whose levels can be adjusted so that the level of the glasses is adjusted closer to the eye level. Among the above, the invertible glasses are exemplified by glasses disclosed in JP 7-199126 A, which can be worn in an inverted manner by inverting the temple to vertically move the ear pieces and vertically displacing the nose pads to allow the eyes to be present near the center of a portion for a long-middle-distance or short-distance vision.

However, since an attachment portion of each temple of the invertible glasses is provided on an outer periphery of a frame of the glasses at the middle of the level of the frame, the eye direction is aligned with a border between the upper and lower lenses when the glasses are inverted, causing a difficulty in looking at the object. The level of the nose pads thus always needs to be adjusted. After the glasses of the above type are inverted in use, the nose pads need to be vertically moved for level adjustment, which would be troublesome. In addition, it is not so easy to vertically move the nose pads for fine adjustment. The eye direction in the inverted state is as shown in FIG. 16C, where the eye level is not aligned with the lens center while the lenses are tilted as a whole. Thus, these glasses cannot eliminate eyestrain.

In this regard, proposed examples of the above type of glasses configured to be inverted in use include Japanese Utility Model Application Publication No. 56-52721 A "PORTABLE SLIM READING GLASSES", JP 2014-85363 A "VERTICALLY INVERTIBLE BIFOCAL GLASSES", Japanese Utility Model Registration No. 3031992 U "GLASSES", and JP 7-159733 A "BIFOCAL GLASSES", among which the glasses of Japanese Utility Model Application Publication No. 56-52721 A and JP 2014-85363 A are likely to be displaced or easily drop due to substantially straight ear pieces thereof. Additionally, the glasses of Japanese Utility Model Registration No. 3031992 U and JP 7-159733 A have upper and lower ear pieces that are simply integrated without any shape modification, so that these glasses have a poor appearance with strangeness and are less suitable for practical use. Furthermore, the glasses of Japanese Utility Model Application Publication No. 56-52721 A, JP 2014-85363 A, Japanese Utility Model Registration No. 3031992 U, and JP 7-159733 A are likely to cause eyestrain due to misalignment between the center of each lens and the eye level.

An object of the invention is to provide a bifocal-glasses frame that allows for easily switching a variety of types of lenses in accordance with an intended use by vertically moving the lenses and aligning a center of each lens with an eye level to reduce eyestrain.

Another object of the invention is to provide a bifocal-glasses frame that allows for easily switching a variety of types of lenses in accordance with an intended use by vertically inverting the lenses and aligning a center of each lens with an eye level to reduce eyestrain.

SUMMARY

According to an aspect of the invention, a bifocal-glasses frame includes: a pair of temples; a connecting bar connecting respective ends of the pair of temples; at least one hanging shaft located at a middle of the connecting bar; nose pads fixed to the hanging shaft; a slide attached to the hanging shaft; a pair of lens-holding frames located in front of the connecting bar and made vertically slidable by the slide, the lens-holding frames being each configured to hold vertically arranged upper and lower lenses; and a bridge coupling the lens-holding frames. The bridge is attached at a level lower than a center of the lower lens in each of the lens-holding frames, and the lens-holding frames are slidable for a distance at least corresponding to a distance between a center of the upper lens and the center of the lower lens.

Additionally, the at least one hanging shaft is in the form of a polygonal column or a pair of shafts and lower ends of the pair of shafts are provided with respective fall-stop portions. The slide may include: a slide bearing configured to receive the hanging shaft therein such that the slide bearing is slidable along the hanging shaft; a holder configured to hold the slide bearing at a predetermined position on the hanging shaft; and a fall-stop provided to an end of the hanging shaft. Furthermore preferable examples of a holding mechanism include: 1) an engagement mechanism including an engagement piece attached to the slide bearing and a spring for pressing the engagement piece against the hanging shaft; 2) a double-clip mechanism including a clip body with a resilience enough to hold the hanging shaft and tabs for opening an end of the clip body, and modifications of such a mechanism; 3) a magnetic mechanism including magnets configured to be attracted to respective upper and lower ends of the hanging shaft and sheet irons attached to respective upper and lower ends of the slide bearing; and 4) a locking mechanism including two locking grooves provided to a surface of the slide bearing and locking pieces provided to respective upper and lower ends of the hanging shaft and engageable with respective locking grooves.

The bifocal-glasses frame of the above aspect includes: a pair of temples; a connecting bar connecting respective ends of the pair of temples; at least one hanging shaft located at a middle of the connecting bar; nose pads fixed to the hanging shaft; a slide attached to the hanging shaft for a sliding movement; a pair of lens-holding frames arranged in front of the connecting bar with the slide being located therebetween so that the lens-holding frames are vertically slidable, the lens-holding frames being each configured to hold vertically arranged upper and lower lenses; and a bridge coupling the lens-holding frames, in which the bridge is attached at a level lower than a center of the lower lens in each of the lens-holding frames, and the lens-holding frames are slidable for a distance at least corresponding to a distance between a center of the upper lens and the center of the lower lens. Such an arrangement allows for easily switching different types of lenses in accordance with an intended use and aligning a center of each lens with an eye level so that the user looks squarely at an object in a natural manner with reduced eyestrain. In particular, the bifocal-glasses frame with the above arrangement allows the lenses of a first pair of glasses and the lenses of a second pair of glasses to be used substantially in the same manner as a pair of glasses whose top sides are fixed to each other. Thus, the user can selectively use the first pair of glasses and the second pair of glasses in accordance with an intended use substantially as if they were separate pairs of glasses. Moreover, the above arrangement allows for the vertical movement without causing the eye level to be misaligned with the center of the lens, providing a very clear vision. This enables promptly and reliably switching one of the pairs of lenses to the other pair of lenses in a simple manner and increasing a usable range of each lens (i.e., a range where the user can move his/her eyes to see). Further, unlike a conventional product, the bifocal-glasses frame of the above aspect almost eliminates the necessity of adjustment or fine adjustment, so that the bifocal-glasses frame is very user-friendly.

In the above aspect, the hanging shaft is in the form of a polygonal column, the slide includes: a slide bearing configured to receive the hanging shaft therein such that the slide bearing is slidable along the hanging shaft; a holder configured to hold the slide bearing at a predetermined position on the hanging shaft; and a fall-stop provided to an end of the hanging shaft, and the holder includes: an engagement piece attached to the slide bearing; and a spring for pressing the engagement piece against the hanging shaft. Such a simple arrangement allows for a smooth vertical motion.

In the above aspect, the slide includes: a clip body with a resilience enough to hold the hanging shaft; and tabs for opening an end of the clip body. This arrangement not only achieves the above effects but also allows for a prompt vertical movement with great ease.

In the above aspect, the at least one hanging shaft includes a pair of shafts, the pair of shafts being each provided with a fall-stop portion at a lower end thereof, and the slide includes: sliding portions configured to receive the respective pair of shafts therein such that the sliding portions are slidable along the respective pair of shafts; a flat spring with a resilience enough for the sliding portions to be held on the hanging shaft; and operation tabs for opening the flat spring. This arrangement achieves the above effects.

In the above aspect, the hanging shaft is in a form of a polygonal column, and the slide includes: a slide bearing configured to receive the hanging shaft therein such that the slide bearing is slidable along the hanging shaft; magnets configured to be attracted to respective upper and lower ends of the hanging shaft; and sheet irons attached to respective upper and lower ends of the slide bearing. This arrangement achieves the above effects.

In the above aspect, the hanging shaft is in a form of a polygonal column, and the slide includes: a slide bearing configured to receive the hanging shaft therein such that the slide bearing is slidable along the hanging shaft; two locking grooves provided to a surface of the slide bearing; and locking pieces provided to respective upper and lower ends of the hanging shaft, the locking pieces being engageable with the respective locking grooves. This arrangement achieves the above effects.

According to another aspect of the invention, a bifocal-glasses frame includes: a pair of temples; a connecting bar connecting respective ends of the pair of temples; a hanging shaft located at a middle of the connecting bar; nose pads fixed to the hanging shaft; a clip member detachably attached to the hanging shaft; a pair of lens-holding frames each configured to hold vertically arranged lenses; and a bridge coupling the lens-holding frames with the clip member being fixed at a middle of the bridge. The lens-holding frames are located in front of the connecting bar. Additionally, the hanging shaft is in a form of a polygonal column or a square U-shaped shaft.

The clip member may include: a clip body with a resilience enough to hold the hanging shaft; and tabs for opening an end of the clip body. For the use of the square U-shaped shaft, the clip member may include: a pair of insertion portions configured to receive the hanging shaft therein; a substantially triangular flat spring to which respective ends of the insertion portions are fixed; and operation tabs for opening the flat spring to increase a distance between the insertion portions.

According to still another aspect of the invention, a bifocal-glasses frame includes: a pair of temples; a connecting bar connecting respective ends of the temples, the connecting bar including a bent portion and a centered downward stepped portion so that the connecting bar does not come into a field of vision; nose pads fixed to the connecting bar; a pair of lens-holding frames each configured to hold vertically arranged lenses; a bridge coupling the pair of lens-holding frames; a shaft erected at a middle of the stepped portion of the connecting bar; and a bearing fixed at a middle of the bridge, the bearing being configured to receive the shaft therein. The lens-holding frames are located in front of the connecting bar. Additionally, a resilient slot may be provided to an end of the erected shaft.

In the above aspect, a bifocal-glasses frame includes: a pair of temples; a connecting bar connecting respective ends of the pair of temples; a hanging shaft located at a middle of the connecting bar; nose pads fixed to the hanging shaft; a clip member detachably attached to the hanging shaft; a pair of lens-holding frames each configured to hold vertically arranged lenses; and a bridge coupling the lens-holding frames with the clip member being fixed at a middle of the bridge, in which the lens-holding frames are located in front of the connecting bar. Such an arrangement allows for easily switching different types of lenses in accordance with an intended use by vertically inverting the lenses and aligning a center of each lens with an eye level so that the user looks squarely at an object in a natural manner with reduced eyestrain. In particular, the bifocal-glasses frame with the above arrangement allows the lenses of a first pair of glasses and the lenses of a second pair of glasses to be used substantially in the same manner as a pair of glasses whose top sides are fixed to each other. Thus, the user can selectively use the first pair of glasses and the second pair of glasses in accordance with an intended use substantially as if they were separate pairs of glasses. Moreover, the above arrangement allows for the vertical movement without causing the eye level to be misaligned with the center of the lens, providing a very clear vision. This enables promptly and reliably switching one of the pair of lenses to the other pair of lenses in a simple manner and increasing a usable range of each lens (i.e., a range where the user can move his/her eyes to see). Further, unlike a conventional product, the bifocal-glasses frame of the above aspect almost eliminates the necessity of adjustment or fine adjustment, so that the bifocal-glasses frame is very user-friendly. Additionally, the lenses can be easily replaceable per se.

In the above aspect, the hanging shaft is in a form of a polygonal column, and the clip member includes: a clip body with a resilience enough to hold the hanging shaft; and tabs for opening an end of the clip body. Such a simple arrangement allows the lenses to be promptly vertically inverted with great ease.

In the above aspect, the hanging shaft is in a form of a square U-shaped shaft, and the clip member includes: a pair of insertion portions configured to receive the hanging shaft therein; a substantially triangular flat spring to which respective ends of the insertion portions are fixed; and operation tabs for opening the flat spring to increase a distance between the insertion portions. This arrangement achieves the above effects.

In the above aspect, a bifocal-glasses frame includes: a pair of temples; a connecting bar connecting respective ends of the temples, the connecting bar including a bent portion and a centered downward stepped portion so that the connecting bar does not come into a field of vision; nose pads fixed to the connecting bar; a pair of lens-holding frames each configured to hold vertically arranged lenses; a bridge coupling the pair of lens-holding frames; a shaft erected at a middle of the stepped portion of the connecting bar; and a bearing fixed at a middle of the bridge, the bearing being configured to receive the shaft therein, in which the lens-holding frames are located in front of the connecting bar. This arrangement achieves the above effects.

In the above aspect, the shaft is in a form of a polygonal column having an end provided with a resilient slot. Such a simple arrangement allows the lenses to be promptly vertically inverted with ease.

DETAILED DESCRIPTION

Figure 1:
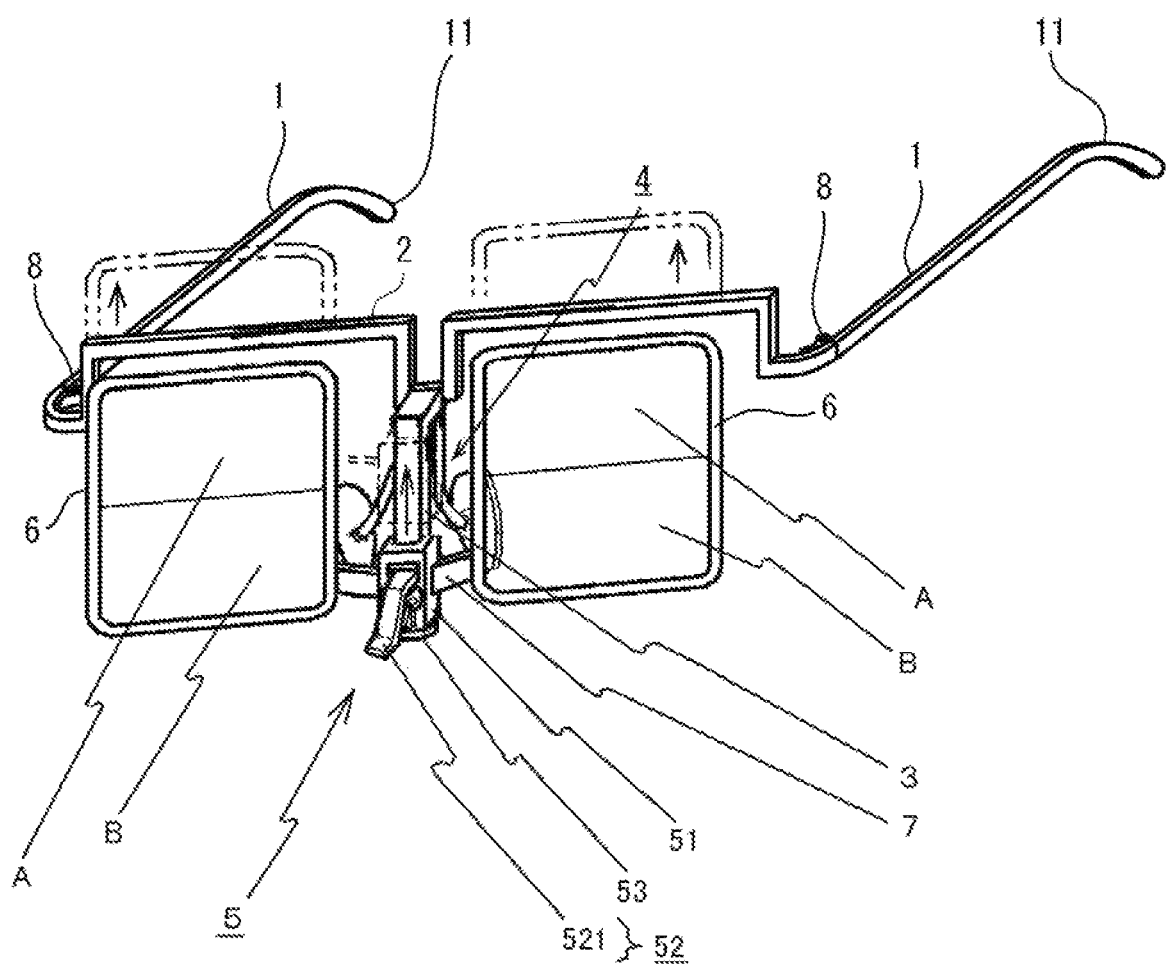
FIG. 1 illustrates a first exemplary embodiment of the invention.

Exemplary embodiments of the invention will be described below with reference to the attached drawings.

The same reference characters refer to the same parts described throughout first, second and subsequent exemplary embodiments and any repetitive detailed description thereof are omitted or simplified.

First Exemplary Embodiment

Figure 2:
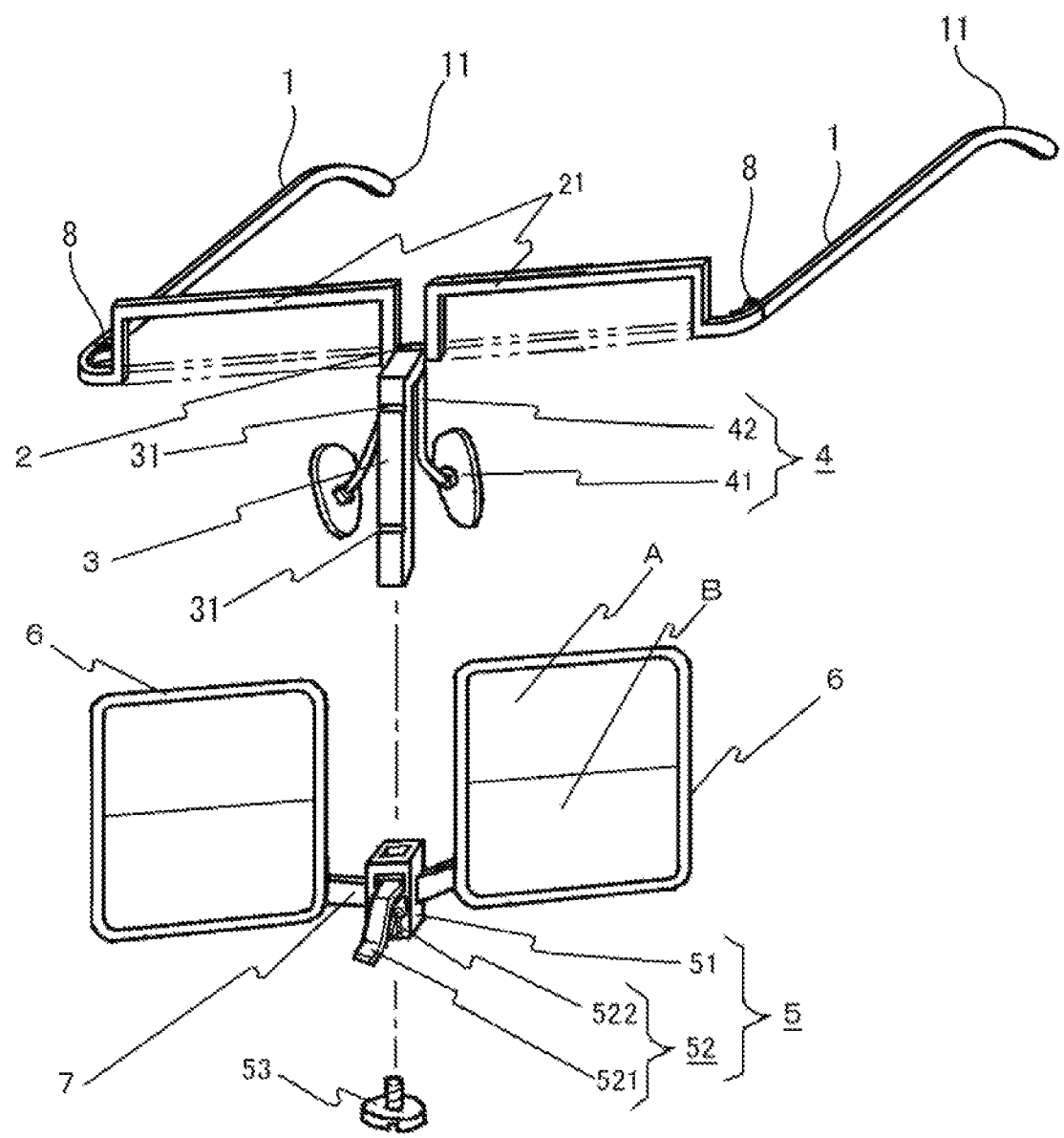
FIG. 2 is a perspective view showing exploded parts according to the first exemplary embodiment.

A first exemplary embodiment of the invention will be described with reference to FIGS. 1 and 2.

A pair of temples 1 are hinged at front ends thereof and rear ends of the temples 1 are provided with respective ear pieces 11.

A connecting bar 2 connects the front ends of the temples 1. The connecting bar 2 and the temples 1 are the same or substantially the same in thickness. The connecting bar 2 is provided with bent portions 21, which are located higher than two-dot chain lines in FIG. 2 by one quarter of a height of lenses (a vertical dimension of lenses) so that the connecting bar 2 does not disadvantageously come into user's field of vision when a frame is put on a user (see FIGS. 9A and 9B). Alternatively, the connecting bar 2 may be formed straight from a clear synthetic resin or the like as shown in the two-dot chain lines so as not to disadvantageously come into the field of vision.

A hanging shaft 3, which is made of a clear synthetic resin, is provided at a middle of the connecting bar 2. The hanging shaft 3 is in the form of a polygonal column (e.g., square column) projecting slightly forward with respect to the connecting bar 2, and has a surface provided with two upper and lower engagement grooves 31 engageable with an end of a later-described engagement piece 521 for positioning. A distance between the two engagement grooves 31 is equal to a distance between respective centers of later-described lenses A and B. The engagement grooves 31 each preferably have a U-shaped cross section. It should be noted that although the hanging shaft 3 is preferably made of a clear synthetic resin, the color and material thereof are not limited.

Nose pads 4 are fixed to the hanging shaft 3. The nose pads 4 each include at least a pad 41 and a support bar 42. An upper end of the support bar 42 is fixed to the hanging shaft 3.

Figure 3:
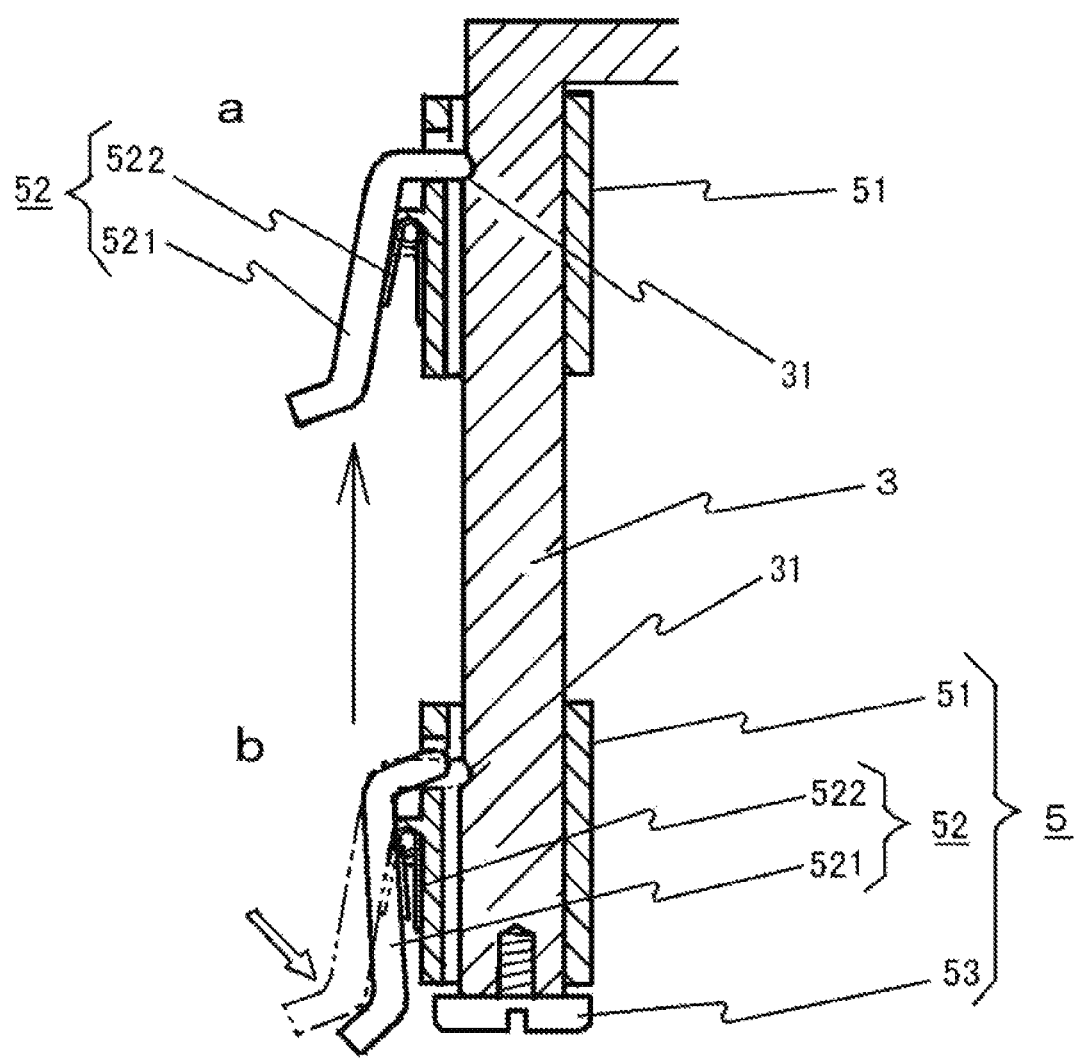
FIG. 3 illustrates an operation of a slide.

A slide 5 is attached to the hanging shaft 3 for a sliding movement. The slide 5 includes a slide bearing 51 of a clear synthetic resin configured to receive the hanging shaft 3 therein such that the slide bearing 51 is slidable along the hanging shaft 3, a holder 52 of a clear synthetic resin configured to hold the slide bearing 51 at a predetermined position on the hanging shaft 3, and a fall-stop 53 provided to an end of the hanging shaft 3. The holder 52 includes an engagement piece 521 with an end engageable with either one of the engagement grooves 31 of the hanging shaft 3 and a spring 522 exhibiting resilience for keeping the engagement between the engagement piece 521 and one of the engagement grooves 31. The end of the engagement piece 521 is rounded in an arc as shown in FIG. 3. The slide bearing 51 is fixed to a middle of a later-described bridge 7. Furthermore, the slide 5 allows later-described lens-holding frames 6 to vertically slide in front of the connecting bar 2. In this regard, a possible sliding displacement of the slide bearing 51 corresponds to the vertical distance between the engagement grooves 31 (i.e., the distance between the respective centers of the later-described lenses A, B), but may be defined larger than this distance with an allowance for extra slide. It should be noted that although the slide bearing 51 and the holder 52 are preferably made of a clear synthetic resin, the color and material thereof are not limited. The holder 52 for the slide bearing 51 may have a structure different from the above.

A pair of lens-holding frames 6 each hold a lens A and a lens B that are vertically arranged. The lens-holding frames 6 each surround the lenses A and B as shown in the figures but the invention is not limited thereto. For instance, the lens-holding frames 6 may be in the form of a frame for frameless glasses. Preferable examples of the lenses A, B held by the lens-holding frames 6 include a concave lens, convex lens, plate glass (e.g., a transparent glass and a polarization plate), colored glass (e.g., sunglasses), and wearable terminal glass. The lenses A, B may each be circular, oval or in any shape, although the lens shown in FIGS. 1 and 2 is rectangular. The lenses A and B are not necessarily separate lenses but may be integrated into a single lens. Further, the lenses A, B may be replaced by a display for a wearable terminal.

Figure 8:
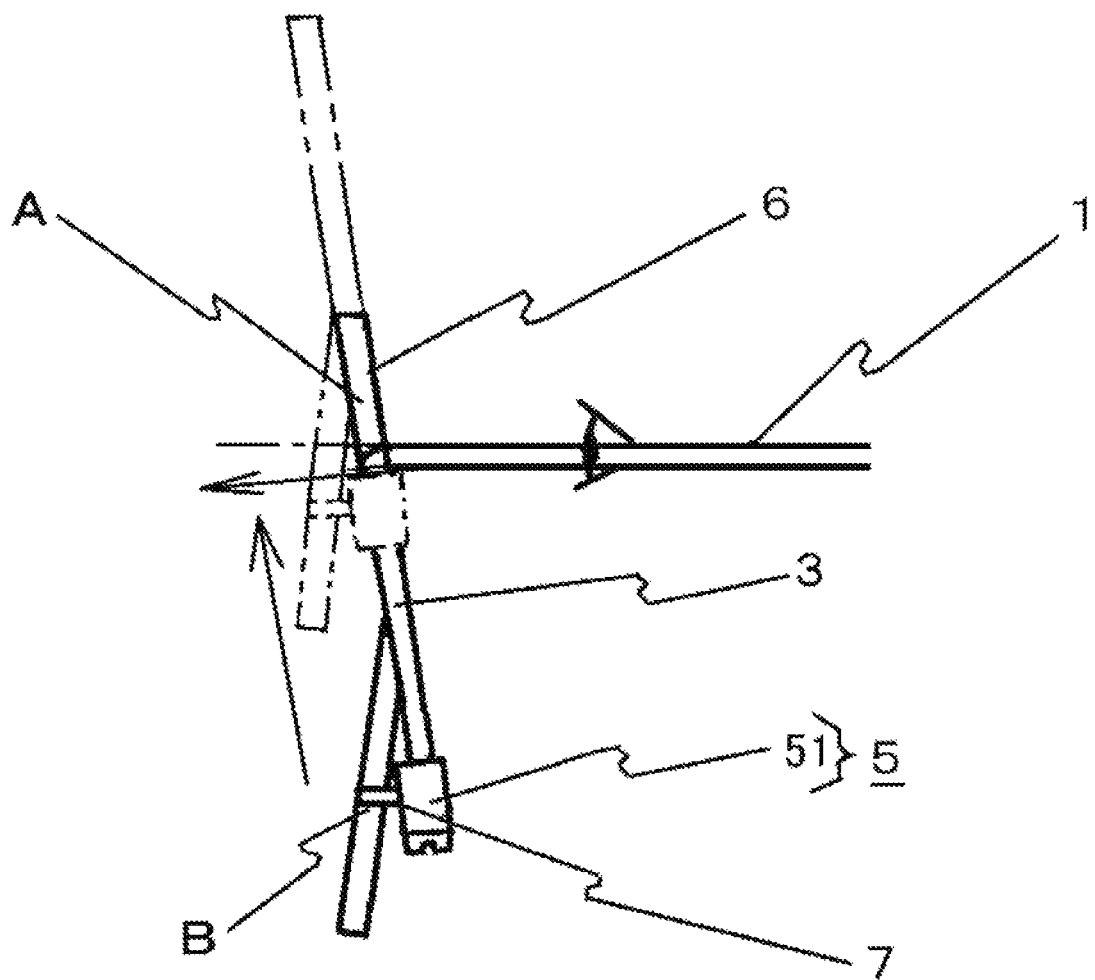
FIG. 8 illustrates a bent lens-holding frame.

Moreover, the lens-holding frames 6 may be bent (inclined) as shown in FIG. 8 such that the lenses A and B are inclined. In this regard, a maximum level difference between each temple 1 and the later-described bridge 7 may correspond to the distance between the respective centers of the lens A and the lens B, while the hanging shaft 3 may be attached to the connecting bar 2 with an inclination so as to be translatable in accordance with an inclination of respective upper portions of the lens-holding frames 6 or, alternatively, may be attached at a right angle. It should be noted that a chain line in the figure shows an eye level.

A bridge 7 couples a pair of lens-holding frames 6 into a one-piece component. The bridge 7 is attached at a level lower than the center of the lower lens in each lens-holding frame 6. The slide bearing 51 is fixed to a middle of the bridge 7. The hanging shaft 3 may be elongated upward beyond the connecting bar 2 with the bridge 7 being attached at a level above the center of the lower lens in each lens-holding frame 6.

A hinge 8, which may be a typical hinge, is used to hinge each temple 1.

Figure 4:
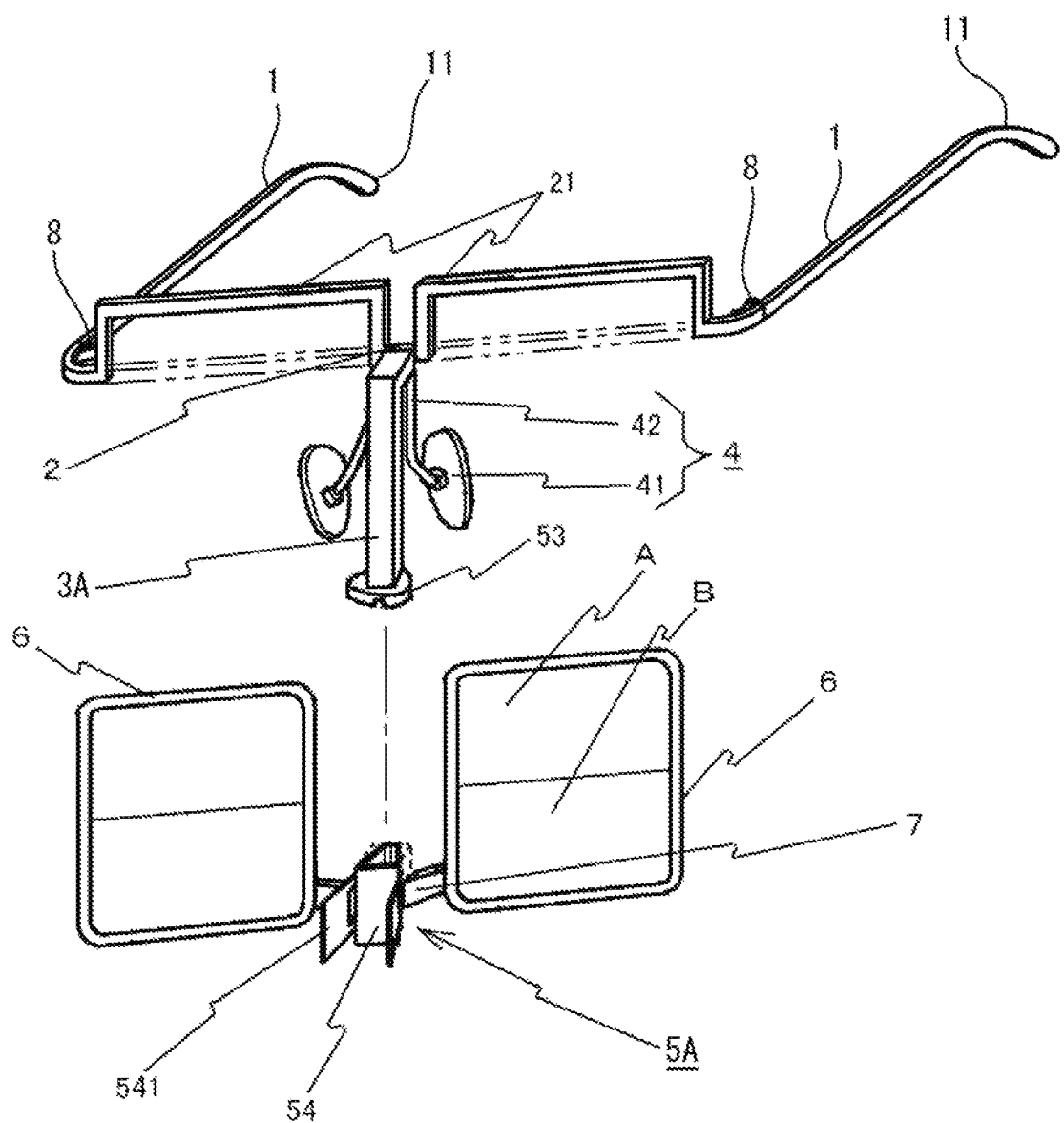
FIG. 4 illustrates exploded parts of a double-clip slide.

FIG. 4 shows an exemplary double-clip slide 5A. The slide 5A includes a clip body 54 of a clear synthetic resin formed by bending a flat spring into a trapezoid and openable at a portion corresponding to an upper side of the trapezoid, tabs 541 of a clear synthetic resin configured to open the clip body 54 so that the clip body 54 holds a hanging shaft 3A, and the fall-stop 53 provided to an end of the hanging shaft 3A. It should be noted that the shape of the clip body 54 may be in any other shape different from trapezoid allowing the clip body 54 to hold the hanging shaft 3A so that the lens-holding frames 6 is fixed. The clip body 54 and the tabs 541 are structurally substantially the same as those of a typical double clip used as stationery. The fall-stop 53 may be formed integrally with the hanging shaft 3A. Although the clip body 54 and the tabs 541 are preferably made of a clear synthetic resin, the color and material thereof are not limited.

Figure 5:
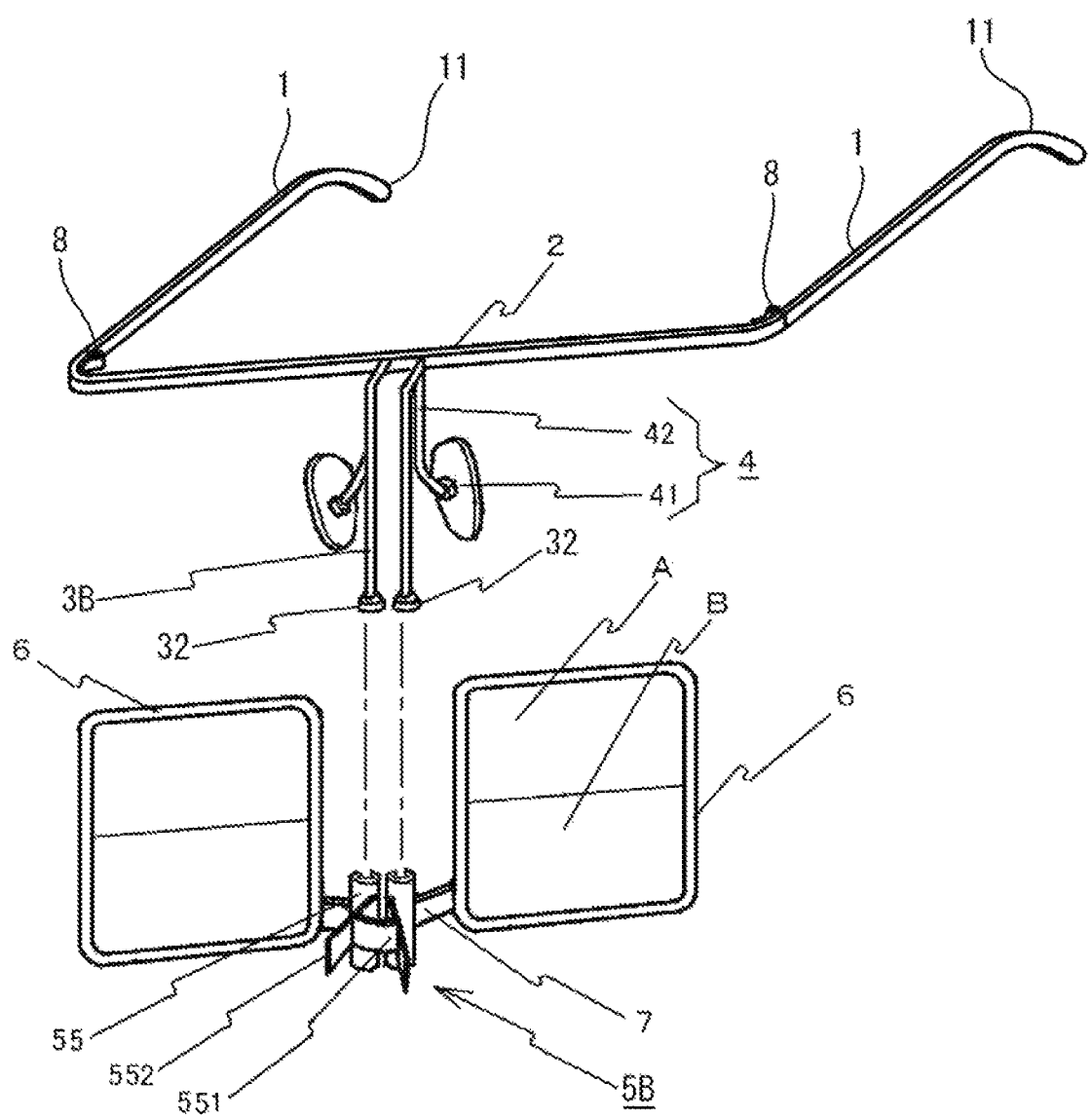
FIG. 5 illustrates exploded parts of a modified double-clip slide.

FIG. 5 shows an exemplary modified double-clip slide 5B. The slide 5B includes sliding portions 55 of a clear synthetic resin configured to receive a pair of hanging shafts 3B therein such that the sliding portions 55 are each slidable along the corresponding hanging shaft 3B, a flat spring 551 of a clear synthetic resin exhibiting resilience enough for holding the sliding portions 55 on the respective hanging shafts 3B, and operation tabs 552 of a clear synthetic resin for opening the flat spring 551. A distance between the sliding portions 55 is changed using the operation tabs 552. Specifically, when the operation tabs 552 are not held by hand, the distance between the sliding portions 55 becomes narrow and a force making the distance narrower than a distance between the pair of hanging shafts 3B is continuously applied, thus holding the lens-holding frames 6 at current positions without dropping. It should be noted that a fall-stop portion 32 is provided to a lower end of each hanging shaft 3B. Although the sliding portions 55, the flat spring 551 and the operation tabs 552 are preferably made of a clear synthetic resin, the color and material thereof are not limited.

Figure 6:
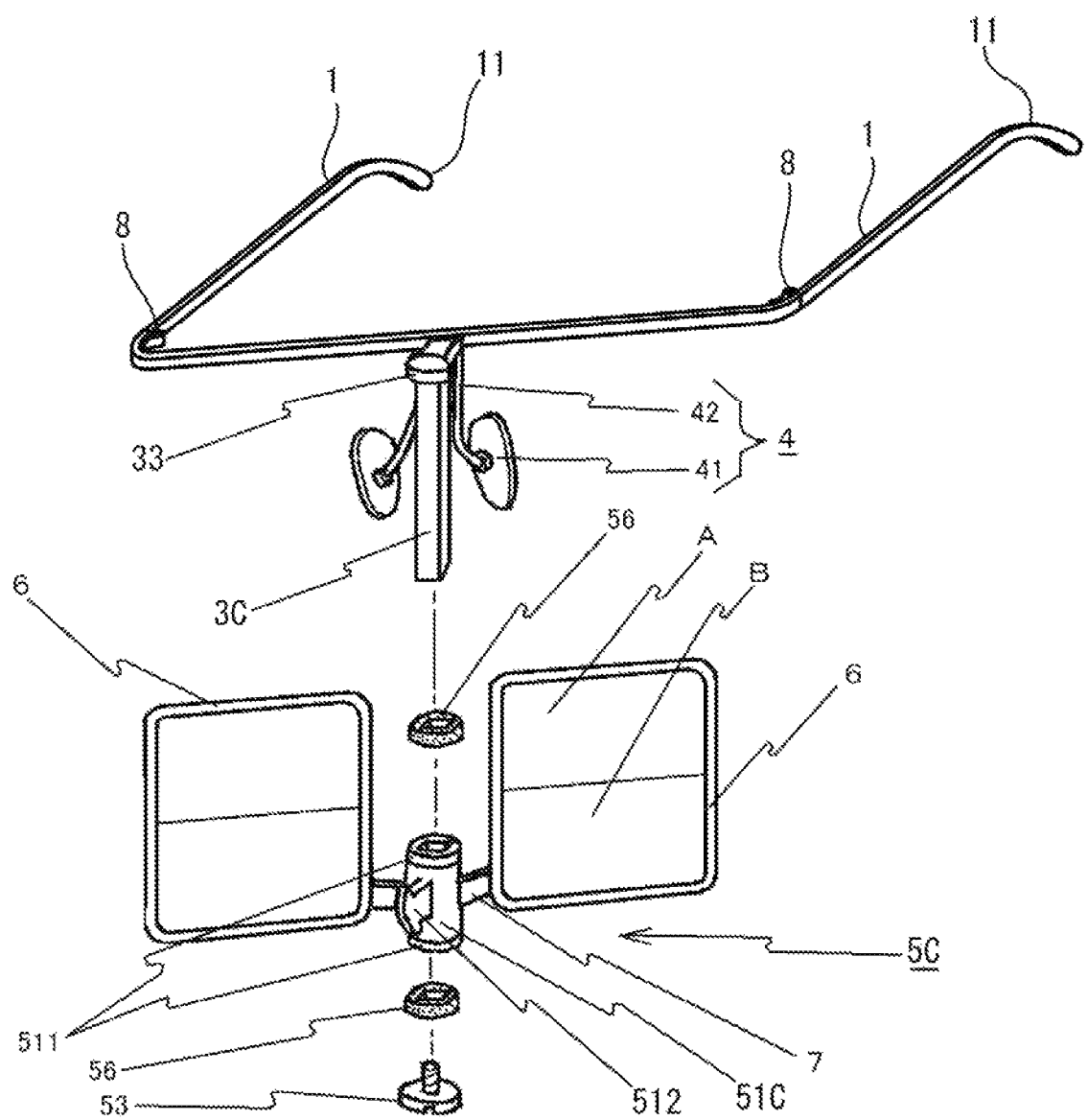
FIG. 6 illustrates exploded parts of a magnetic slide.

FIG. 6 shows an exemplary magnetic slide 5C. The slide 5C includes a slide bearing 51C of a clear synthetic resin configured to receive a hanging shaft 3C therein such that the slide bearing 51C is slidable along the hanging shaft 3C, a fall-stop 53 provided to an end of the hanging shaft 3C, magnets 56 configured to be attracted to respective upper and lower ends of the hanging shaft 3C, and sheet irons 511 attached to respective upper and lower ends of the slide bearing 51C. An integral handle 512 projects from a surface of the slide bearing 51C. It should be noted that although the slide bearing 51C is preferably made of a clear synthetic resin, the color and material thereof are not limited. It should also be noted that a fall-stop portion 33 is provided to the upper end of the hanging shaft 3C.

Figure 7:
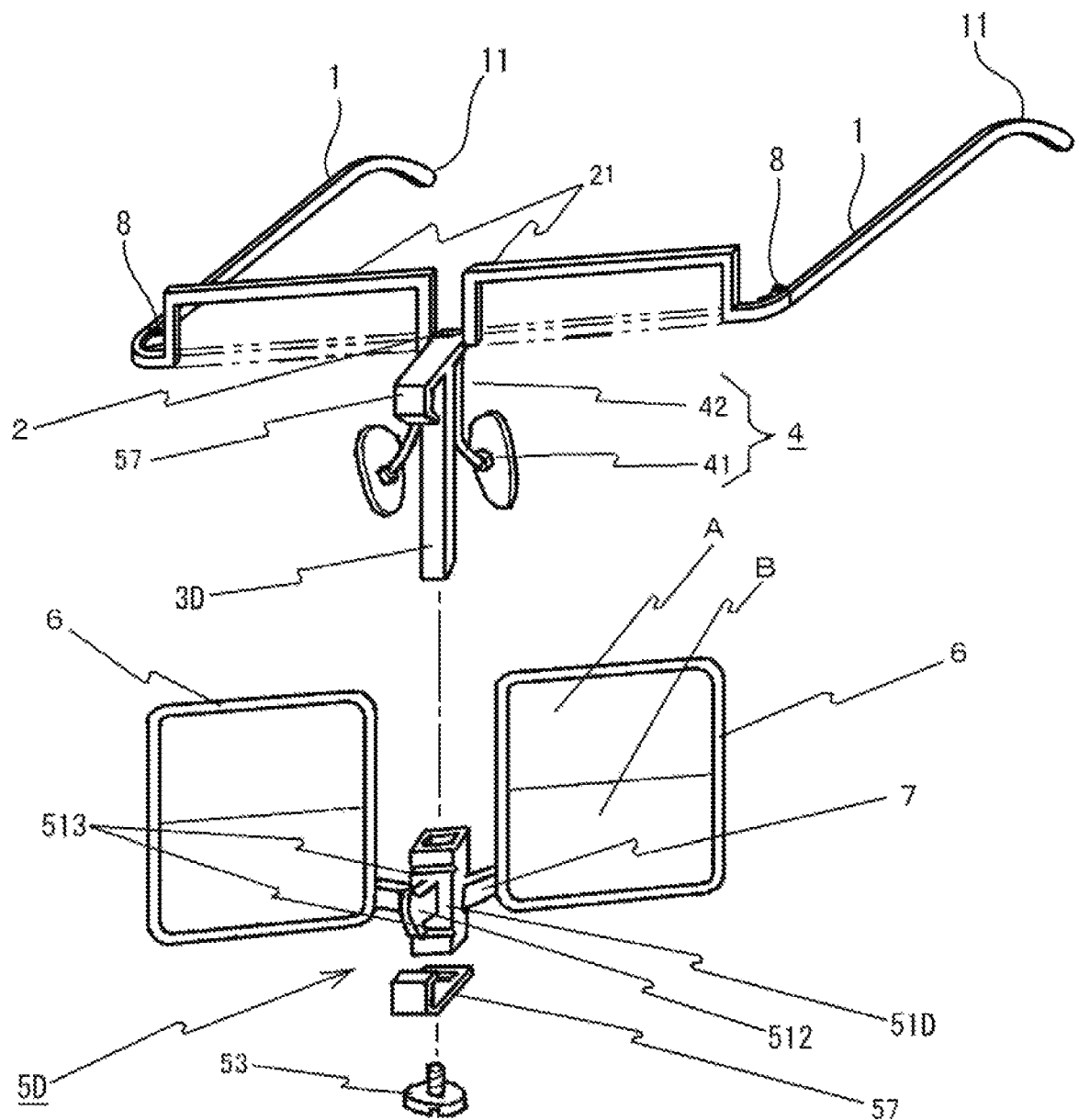
FIG. 7 illustrates exploded parts of a locking slide.

FIG. 7 shows an exemplary locking slide 5D. The slide 5D includes a slide bearing 51D of a clear synthetic resin configured to receive a hanging shaft 3D therein such that the slide bearing 51D is slidable along the hanging shaft 3D, two locking grooves 513 provided to a surface of the slide bearing 51D, locking pieces 57 configured to be engaged with the respective locking grooves 513 while being provided to upper and lower ends of the hanging shaft 3D, and a fall-stop 53 provided to the end of the hanging shaft 3D. The locking grooves 513 are preferably engaged with the upper and lower locking pieces 57 with a level difference therebetween corresponding to the distance between the respective centers of the lens A and the lens B. It should be noted that although the slide bearing 51D and the locking pieces 57 are preferably made of a clear synthetic resin, the color and material thereof are not limited. The locking piece 57 provided to the upper end of the hanging shaft 3D may be integral with the hanging shaft 3D.

An operation of the slide 5 according to the exemplary embodiment will be described below with reference to FIG. 3. First, the engagement piece 521 in a state shown by two-dot chain lines at a position "b" is pressed as shown by an outline arrow with a finger, disengaging the end of the engagement piece 521 from the lower engagement groove 31 as shown by solid lines. The slide bearing 51 is then moved upward in an arrow direction with a finger and released, bringing the end of the engagement piece 521 into contact with the surface of the hanging shaft 3. As the slide bearing 51 in this state is moved upward with a finger, the end of the engagement piece 521 is engaged with the upper engagement groove 31. At this time, while the end of the engagement piece 521 is engaged with the upper engagement groove 31, a resilience of the spring 522 is applied to the end of the engagement piece 521, thus reliably stopping the slide bearing 51 at a position "a" in FIG. 3. As a result, the lens-holding frames 6 are moved upward with the eye level (the level of the temples) being aligned with the center of the lens B instead of the center of lens A.

Next, to move the slide bearing 51 from the position "a" to the position "b" in FIG. 3, the engagement piece 521 is pressed with a finger to disengage the end of the engagement piece 521 from the upper engagement groove 31 and, subsequently, the slide bearing 51 is moved downward to engage the end of the engagement piece 521 to the lower engagement groove 31. The slide bearing 51 is thus reliably returned to the position "b".

It should be noted that for the slide 5 in the form shown in FIG. 4 or FIG. 5, the clip body 54 or the sliding portion 55 can be held at a predetermined position by pinching and moving the tabs 541 or the operation tabs 552 to move the clip body 54 or the sliding portion 55 to the predetermined position and, subsequently, releasing the tabs 541 or the operation tabs 552. For the slide 5 in the form shown in FIG. 6 or FIG. 7, the slide bearing 51C or 51D can be held at a predetermined position by pinching the handle 512 of the slide bearing 51C or 51D with fingers and moving it upward and downward to bring the slide bearing 51C or 51D into contact for magnetic fixation or lock of the slide bearing 51C or 51D.

Figure 9A:
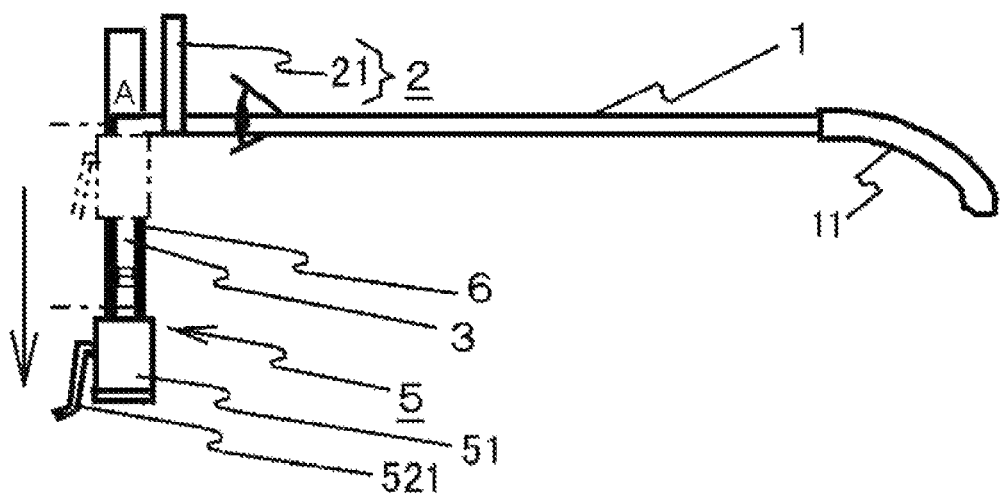
FIG. 9A illustrates an operation according to the exemplary embodiment.
Figure 9B:
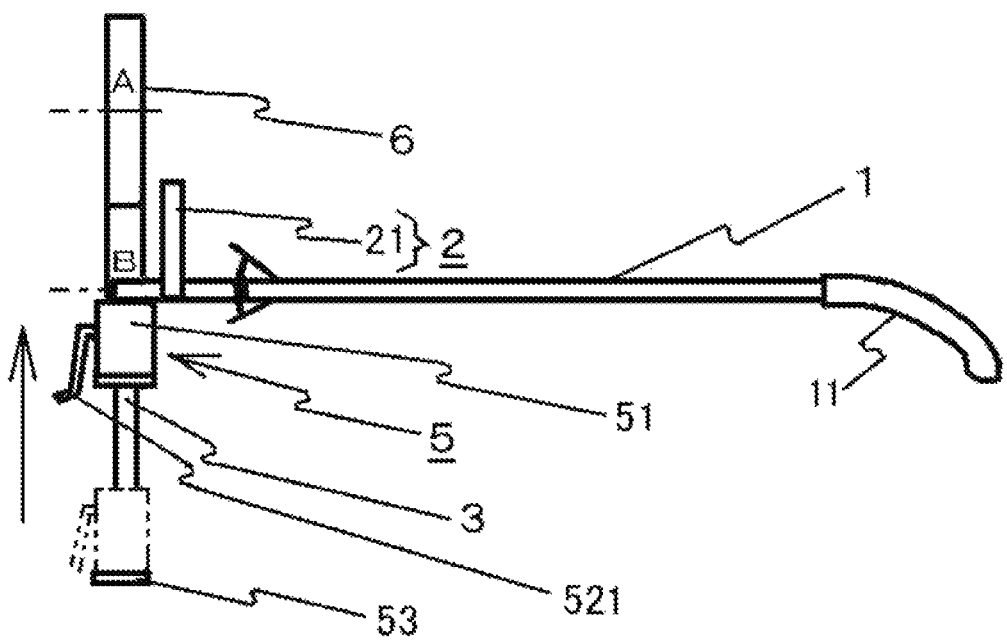
FIG. 9B illustrates the operation according to the exemplary embodiment.

Operations and advantages of the first exemplary embodiment of the invention will be described below with reference to FIGS. 9A and 9B. First, a state shown in FIG. 9A is explained. When the user wears glasses in the state shown in FIG. 9A, the eye level of the user is aligned with the center of the lens A, so that the user can see an object very clearly and upper and lower sides of the lens A are effectively usable. In order to subsequently use the lens B, the engagement piece 521 is first pressed with a finger to disengage the engagement piece 521 and, subsequently, the slide bearing 51 is moved upward as shown by an arrow in FIG. 9B to bring the end of the engagement piece 521 into engagement with the upper engagement groove 31. The slide bearing 51 is thus stopped at a position shown in FIG. 9B and held without dropping. The center of the lens B is aligned with the eye level in this state in the same manner as when the lens A is used. The user can thus look straight at the object, so that eyestrain of the user is drastically reducible.

The lens-holding frames 6 are vertically moved simply by vertically moving the slide bearing 51 as described above. In this regard, the slide is easily operable when configured to be held simply upon contact with the upper or lower end surface using, for instance, the clip body 54 or the sliding portion 55 without providing the engagement groove 31 as shown in FIGS. 4 and 5. In addition, only the lenses and relevant parts are vertically moved without the necessity of changing a positional relationship between the nose pads 4, the ear pieces 11, and the temples 1.

Further, for instance, when a concave lens is used as the lens A and a convex lens is used as the lens B, the conventional problems can be quickly solved. Specifically, 1) the user can be prevented from suffering a blurring forward vision or an incorrect feeling of distance due to out-of-focus eyes when looking at an object ahead immediately after operating devices, such as a car navigation device and an audio device, around a driver's seat. 2) When the user sitting in front of a computer visually checks data and characters at hand and then looks at the computer screen, the user can be prevented from feeling it difficult to look at small characters and feeling dazzled, resulting in a reduction in eyestrain, headache, stiff shoulder and the like. 3) The user can walk down stairs without a difficulty such as blurring vision around his/her foot sight, so that the user can be prevented from accidentally stepping off the stairs. 4) The user can read a newspaper or a magazine while watching a TV with less frequency of out-of-focus eyes. 5) During fishing in a rocky area, the user can walk around the rocky area with almost no risk of stumbling over a rock even immediately after putting a bait on a hook.

A sunglass may be used as the lens A while a convex lens may be used as the lens B. In this case, immediately after operating, in particular, a car navigation device, an audio device or the like around a driver's seat using the sunglass, the user can change the lens to the sunglass to look so as not to suffer a blurring forward vision or an inaccurate distance-feeling nor feel dazzled. A wearable terminal glass may be used as the lens A while a convex lens may be used as the lens B. In this case, the user who wears the lens B as glasses can use the wearable terminal without taking off the glasses.

Thus, the frame in the first exemplary embodiment allows the two types of lenses A, B to be easily individually used without changing the glasses.

Second Exemplary Embodiment

Figure 10:
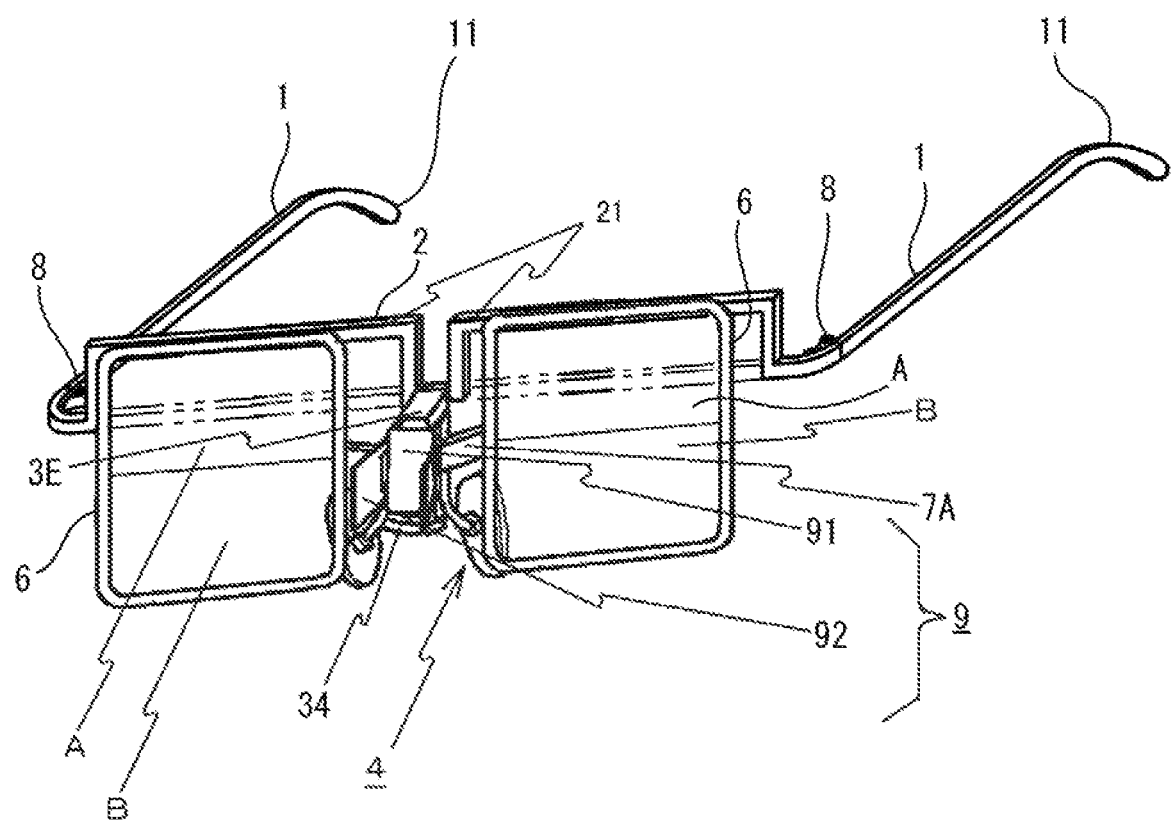
FIG. 10 illustrates a second exemplary embodiment of the invention.
Figure 11:
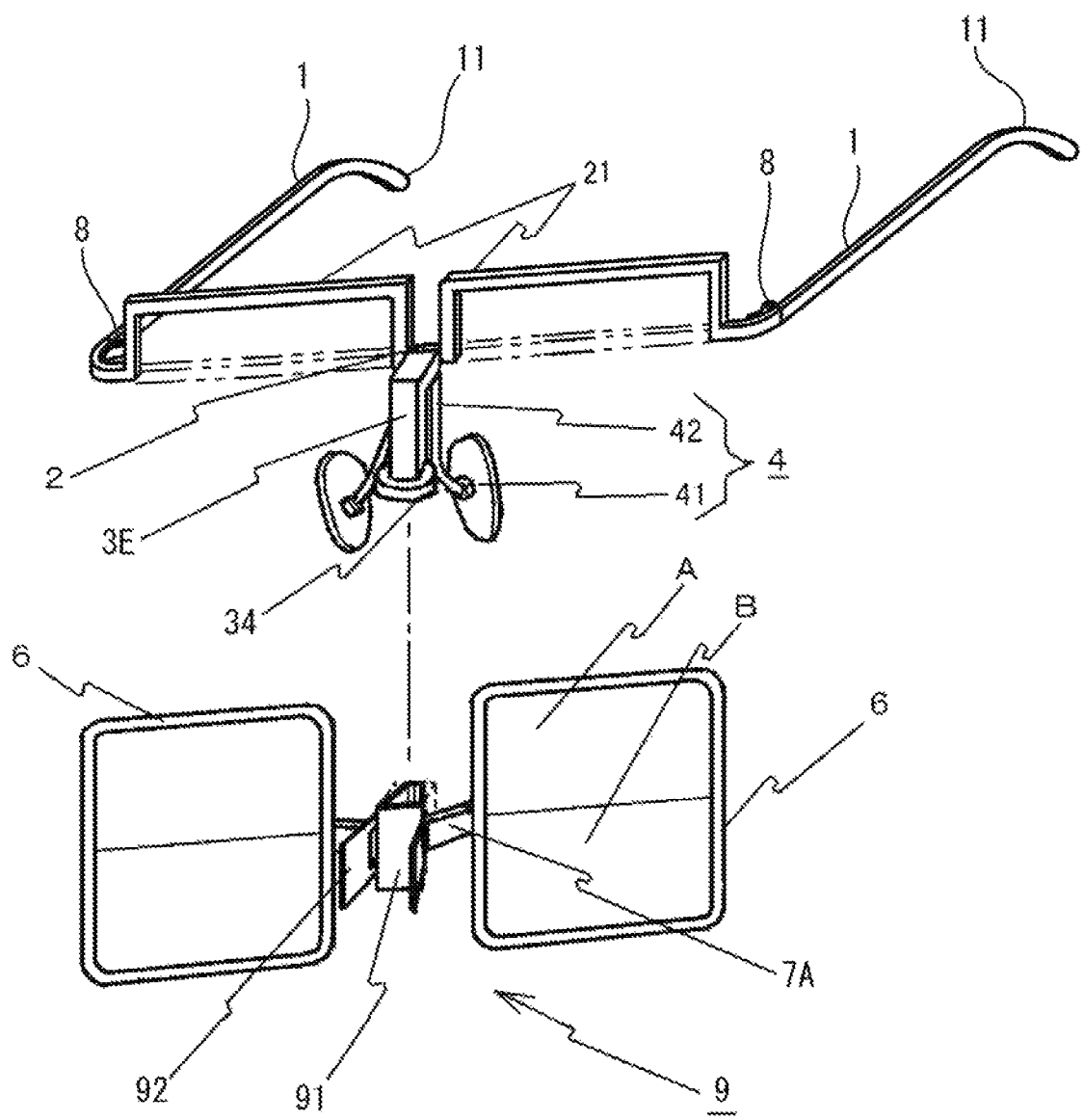
FIG. 11 is a perspective view showing exploded parts according to the second exemplary embodiment.

A second exemplary embodiment of the invention will be described with reference to FIGS. 10 and 11.

A hanging shaft 3E, which is in the form of a polygonal column (e.g., square column), projects slightly forward with respect to the connecting bar 2 (see FIG. 11 and FIGS. 14A to 14C). Additionally, a flange-shaped fall-preventing portion 34 is formed integrally with a lower end of the hanging shaft 3E. It should be noted that the upper end of the support bar 42 may be fixed to the connecting bar 2 instead of being fixed to the hanging shaft 3E.

A clip member 9 is configured to attach the later-described lens-holding frames 6 to the hanging shaft 3E such that the lens-holding frames 6 are removable. The clip member 9 includes a clip body 91 with a resilience enough to hold the hanging shaft 3E, and tabs 92 configured to open an end of the clip body 91. The clip body 91 is formed from a flat spring of a clear synthetic resin into a triangle and has an openable end corresponding to an apex of the triangle. An end of each tab 92 is located on an edge of the opening of the clip body 91. The tabs 92, which are made of a clear synthetic resin, are configured to open the clip body 91 so that the clip body 91 holds the hanging shaft 3E. It should be noted that the materials of the clip body 91 and the tabs 92 are not limited to a clear synthetic resin, but any colors and materials are selectable that do not block the field of vision. The clip body 91 and the tabs 92 are structurally substantially the same as a typical double clip used as stationery.

Moreover, the lens-holding frames 6 may be bent (inclined) forward or rearward (not shown) such that the lenses A and B are inclined.

A bridge 7A is attached at a position as high as a middle of each lens-holding frame 6. Additionally, the clip body 91 of the clip member 9 is attached at a middle of the bridge 7A.

Figure 12:
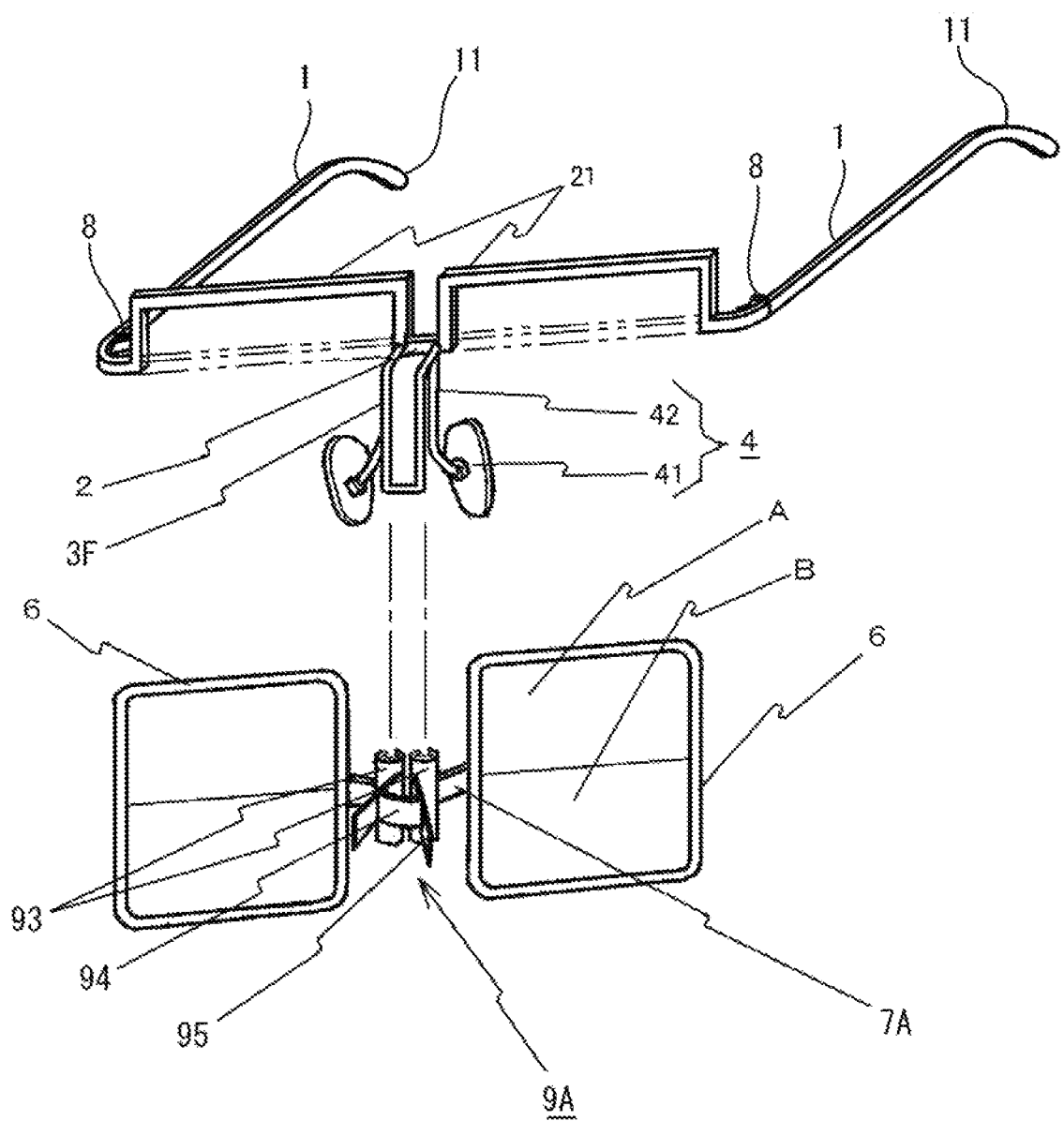
FIG. 12 is a perspective view showing exploded parts of another exemplary clip member according to another exemplary embodiment.

FIG. 12 shows an exemplary clip member 9A. While a hanging shaft 3F is formed from a wire rod into a square U-shape, the clip member 9A includes a pair of insertion portions 93 of a clear synthetic resin configured to receive the hanging shaft 3F therein, a substantially triangular flat spring 94 of a clear synthetic resin with ends fixed to the insertion portions 93, and operation tabs 95 of a clear synthetic resin for opening the flat spring 94 to increase a distance between the insertion portions 93. Although the insertion portions 93, the flat spring 94, and the operation tabs 95 are preferably made of a clear synthetic resin, any colors and materials are selectable that do not block the field of vision.

Figure 13:
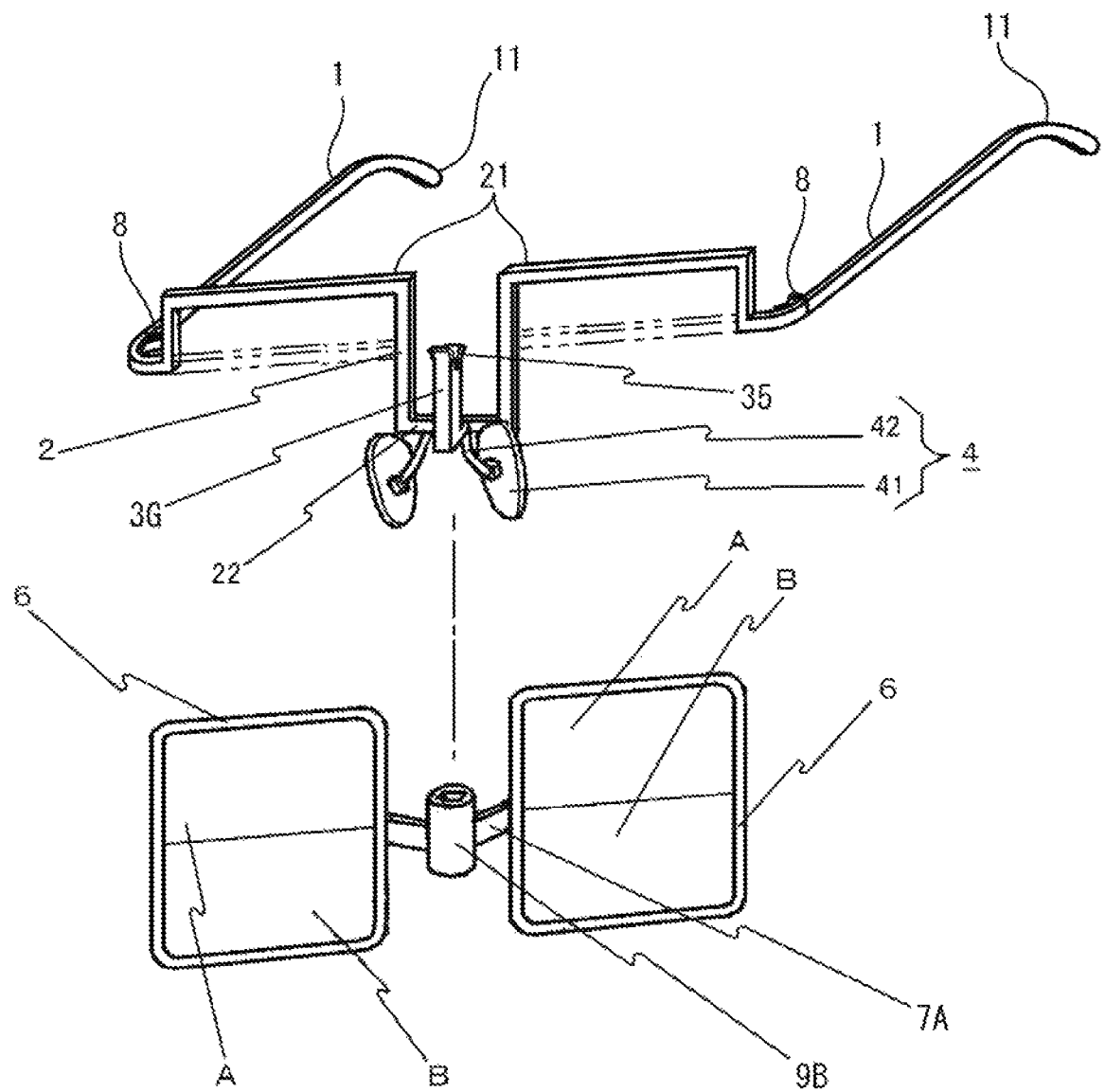
FIG. 13 illustrates exploded parts of still another example.

FIG. 13 shows another example of the clip member 9, where the connecting bar 2 is recessed downward at the center thereof defining a stepped portion 22 and a shaft 3G of a clear synthetic resin is erected at a center of the stepped portion 22 in place of the hanging shaft 3E. In addition, the clip member 9 is replaced by a bearing 9B of a clear synthetic resin configured receive the shaft 3G therein. The bearing 9B is fixed at the middle of the bridge 7A while being formed integrally between the pair of lens-holding frames 6. This arrangement allows the lens-holding frames 6 to be vertically inverted by removing the bearing 9B from the shaft 3G and inserting, after the lens-holding frames 6 are vertically inverted, the shaft 3G into the bearing 9B. A resilient slot 35 is provided to an end of the shaft 3G. The slot 35 is configured to prevent detachment of the shaft 3G from the bearing 9B after the insertion of the shaft 3G. The shaft 3G is preferably in the form of a polygonal column (e.g., square column) but may be in any other form (e.g., elliptic cylinder) as long as the shaft 3G is not rotatable.

Figure 14A:
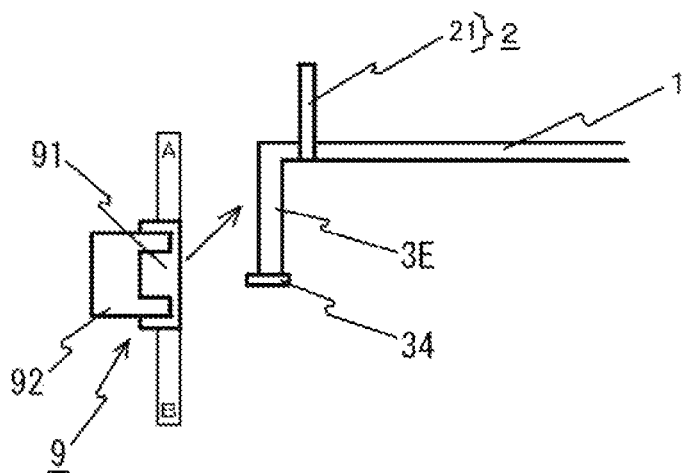
FIG. 14A illustrates an operation according to the exemplary embodiment.

Operations and advantages of the second exemplary embodiment of the invention will be described below with reference to FIGS. 14A to 14C. First, a state shown in FIG. 14A is explained. The lens A is held in an upper side of each lens-holding frame 6 and the lens B is held in a lower side. The clip member 9 is attached between the lens-holding frames 6 via the bridge 7A (see FIG. 11). First, the clip body 91 is widely opened by pressing the tabs 92 with fingers, and then moved in an arrow direction in FIG. 14A to hold the hanging shaft 3E. At this time, the clip body 91 is released from the fingers after it is checked whether upper and lower ends of the clip body 91 are unintentionally located on the fall-preventing portion 34 and/or a top of the hanging shaft 3E and whether the clip body 91 holds the hanging shaft 3E at a predetermined position. The lens-holding frames 6 are thus mounted on the hanging shaft 3E. At this time, the clip body 91 continuously receives a force making the clip body 91 hold the hanging shaft 3E.

Figure 14B:
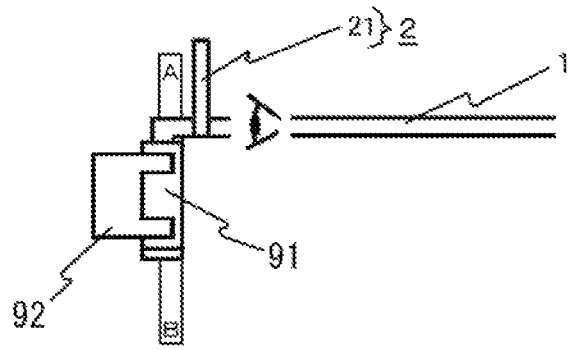
FIG. 14B illustrates the operation according to the exemplary embodiment.
Figure 14C:
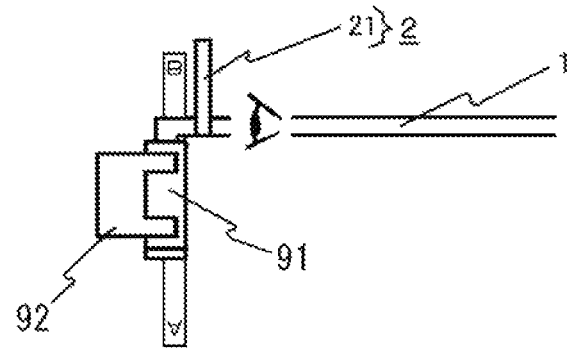
FIG. 14C illustrates the operation according to the exemplary embodiment.

FIG. 14B shows that the glasses in the above state are worn. At this time, the eye level of the user is aligned with the center of the lens A, so that the user can see an object very clearly and upper and lower sides of the lens A are effectively usable. In order to subsequently use the lens B, the tabs 92 are first pressed with fingers to widely open the clip body 91 for detachment from the hanging shaft 3E. After the lens-holding frames 6 are vertically inverted, the clip body 91 is clipped (attached) on the hanging shaft 3E and the tabs 92 are released from the fingers. The clip body 91 continuously receives the force making the clip body 91 hold the hanging shaft 3E at a position shown in FIG. 14C. At this time, the center of the lens B is aligned with the eye level in the same manner as when the lens A is used. The user can thus look straight at the object, so that eyestrain of the user is drastically reducible.

Next, operations and advantages of the exemplary embodiment shown in FIG. 13 will be described. First, for instance, a user wears the glasses in the state for the use of the lens A as shown in FIG. 14B. Since the eye level is aligned with the center of the lens A, the user can see an object very clearly while the upper and lower sides of the lens A are effectively usable as described above. In order to subsequently use the lens B, the slot 35 of the shaft 3G is first pinched with fingers to be thinned, while the bearing 9B is pinched with fingers of the other hand and moved upward to be removed from the shaft 3G. After the lens-holding frames 6 are vertically inverted, the end of the shaft 3G is inserted into the bearing 9B. At this time, when the end of the shaft 3G is inserted into the bearing 9B, a space between ends of the slot 35 is eliminated. As the shaft 3G is further inserted through the bearing 9B, a resilience of the slot 35 restores the space, making the ends of the slot 35 spaced from each other. This prevents detachment of the bearing 9B from the shaft 3G.

Merely by removing the lens-holding frames 6 from the hanging shaft 3E or the shaft 3G and then attaching the lens-holding frames 6 having been vertically inverted as described above, the different types of lenses (i.e., the lenses A, B) can be switched in accordance with an intended use through the vertical inversion of the lenses A, B.

It should be noted that merely a single pair of lenses may be held in the lens-holding frames 6 and replaced as needed instead of the different types of lenses A, B being held in the upper and lower sides. For instance, two or more types of glasses, such as a pair of convex lenses and a pair of sunglasses, may be prepared and replaced with each other in accordance with an intended use.

Description will be made on a specific example of switching the different types of glasses (i.e., the glasses A, B) vertically arranged in the lens-holding frames 6. For instance, when a concave lens is used as the lens A and a convex lens is used as the lens B, the conventional problems can be quickly solved. In other words, the conventional problems can be solved in the same manner as in the first exemplary embodiment.

Third Exemplary Embodiment

Figure 15:
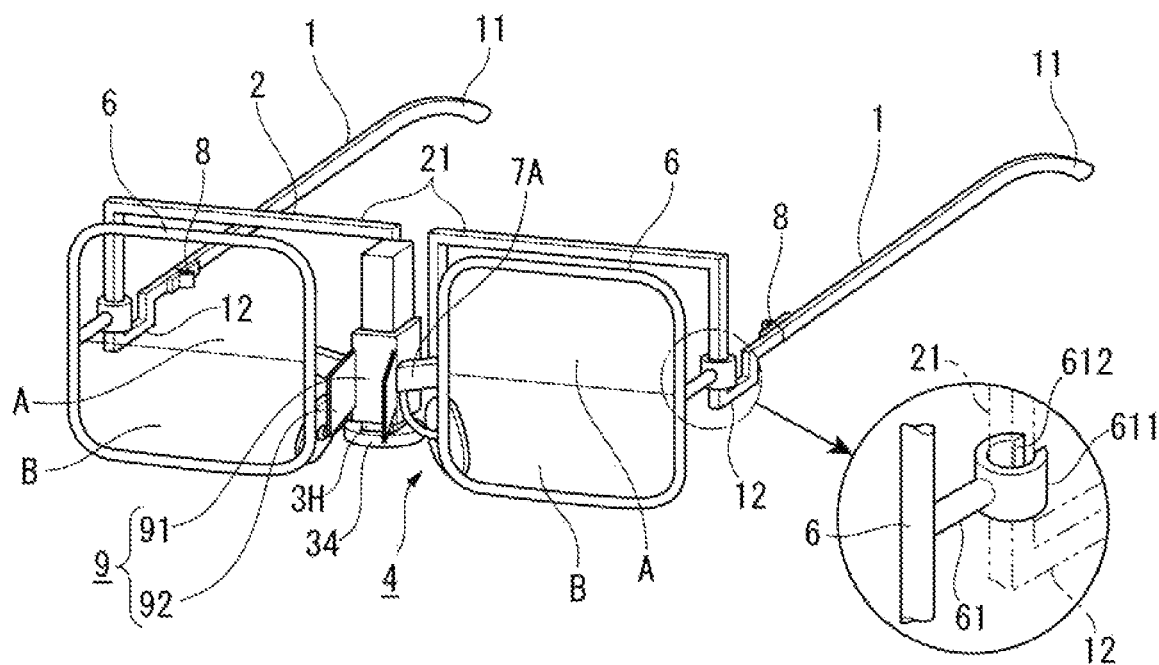
FIG. 15 illustrates a third exemplary embodiment of the invention.
Figure 16A:
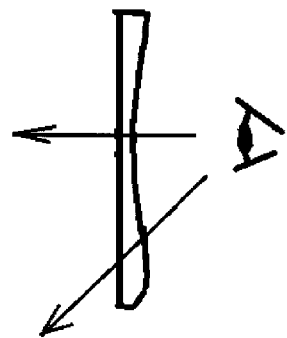
FIG. 16A illustrates eye directions through a conventional pair of glasses.
Figure 16B:
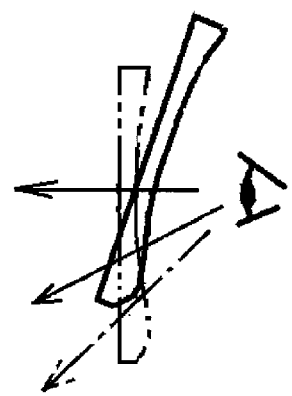
FIG. 16B illustrates eye directions through another conventional pair of glasses.
Figure 16C:
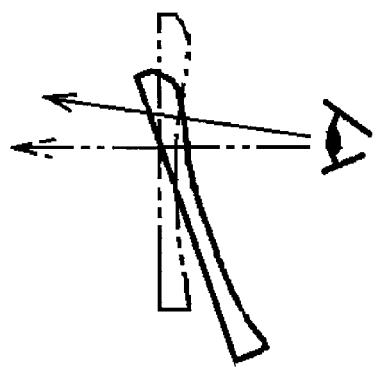
FIG. 16C illustrates eye directions through still another conventional pair of glasses.

A third exemplary embodiment of the invention will be described with reference to FIG. 15.

Each temple 1 includes a dent 12. The dent 12 is close to the connecting bar 2 with respect to the hinge 8 such that the dent 12 is a downward dent when viewed in a direction from the hinge 8 toward the connecting bar 2. A front end of the dent 12 is connected to the bent portion 21 of the connecting bar 2.

The bent portion 21 of the connecting bar 2 is widened in a right-left direction such that right and left parts (outer frames) of the bent portion 21 are aligned with corresponding parts of the lens-holding frames 6 or located at an outside of the corresponding parts when viewed in a front-rear direction. The bent portion 21 is linearly erected from the front end of the dent 12 of each temple 1.

The hanging shaft 3H has an upper extension in the form of the hanging shaft 3E. The hanging shaft 3H supports the clip member 9 (slide) such that the clip member 9 is vertically movable.

The lens-holding frames 6 are supported by the clip body 91 of the clip member 9 via the bridge 7A. The lens-holding frames 6 are each provided with a damper 61.

The damper 61 includes an engagement portion 611 detachably engageable with the bent portion 21 of the connecting bar 2. The engagement portion 611 is a cylindrical elastic member of rubber or the like having a circumferential surface with an axial slit 612.

The third exemplary embodiment can achieve the same advantages as those of the first exemplary embodiment and the second exemplary embodiment.

For instance, the center of either the lens A or B can be aligned with the eye level by removing the clip body 91 from the hanging shaft 3H, and again attaching the clip body 91 on the hanging shaft 3H after the lens-holding frames 6 are vertically inverted.

Furthermore, the lens-holding frames 6 can be vertically moved by vertically moving the clip member 9, aligning the center of either the lens A or B with the eye level.

The invention claimed is:

1. A bifocal-glasses frame comprising:
a pair of temples;
a connecting bar connecting respective ends of the pair of temples;
at least one hanging shaft located at a middle of the connecting bar;
nose pads fixed to the hanging shaft;
a slide attached to the hanging shaft for a sliding movement;
a pair of lens-holding frames arranged in front of the connecting bar with the slide being located therebetween so that the lens-holding frames are vertically slidable, the lens-holding frames being each configured to hold vertically arranged first and second lenses; and
a bridge coupling the lens-holding frames, wherein
the bridge is attached at a level lower than a center of lower one of the first and second lenses in each of the lens-holding frames, and
the lens-holding frames are slidable for a distance at least corresponding to a distance between a center of the first lens and the center of the second lens.

2. The bifocal-glasses frame according to claim 1, wherein
the slide comprises:
a slide bearing configured to receive the hanging shaft therein such that the slide bearing is slidable along the hanging shaft; a holder configured to hold the slide bearing at a predetermined position on the hanging shaft; and
a fall-stop provided to an end of the hanging shaft, and the holder comprises:
an engagement piece attached to the slide bearing; and
a spring for pressing the engagement piece against the hanging shaft.

3. The bifocal-glasses frame according to claim 1, wherein the slide comprises:
a clip body with a resilience enough to hold the hanging shaft; and
tabs for opening an end of the clip body.

4. The bifocal-glasses frame according to claim 1, wherein
the at least one hanging shaft comprises a pair of shafts, the pair of shafts being each provided with a fall-stop portion at a lower end thereof, and
the slide comprises:
sliding portions configured to receive the respective pair of shafts therein such that the sliding portions are slidable along the respective pair of shafts;
a flat spring with a resilience enough for the sliding portions to be held on the hanging shaft; and
operation tabs for opening the flat spring.

5. The bifocal-glasses frame according to claim 1, wherein
the hanging shaft is in a form of a polygonal column, and the slide comprises:
a slide bearing configured to receive the hanging shaft therein such that the slide bearing is slidable along the hanging shaft;
magnets configured to be attracted to respective upper and lower ends of the hanging shaft; and
sheet irons attached to respective upper and lower ends of the slide bearing.

6. The bifocal-glasses frame according to claim 1, wherein
the hanging shaft is in a form of a polygonal column, and the slide comprises:
a slide bearing configured to receive the hanging shaft therein such that the slide bearing is slidable along the hanging shaft;
two locking grooves provided to a surface of the slide bearing; and
locking pieces provided to respective upper and lower ends of the hanging shaft, the locking pieces being engageable with the respective locking grooves.

7. A bifocal-glasses frame comprising:
a pair of temples;
a connecting bar connecting respective ends of the pair of temples;
a hanging shaft located at a middle of the connecting bar;
nose pads fixed to the hanging shaft;
a clip member detachably attached to the hanging shaft;
a pair of lens-holding frames being each configured to hold vertically arranged lenses; and
a bridge coupling the lens-holding frames at a level of a center of the lens-holding frames with the clip member being fixed at a middle of the bridge, wherein
the lens-holding frames are located in front of the connecting bar.

8. The bifocal-glasses frame according to claim 7, wherein
the hanging shaft is in a form of a polygonal column, and the clip member comprises: a clip body with a resilience enough to hold the hanging shaft; and tabs for opening an end of the clip body.

9. The bifocal-glasses frame according to claim 7, wherein
the hanging shaft is in a form of a square U-shaped shaft, and
the clip member comprises:
a pair of insertion portions configured to receive the hanging shaft therein;
a substantially triangular flat spring to which respective ends of the insertion portions are fixed; and
operation tabs for opening the flat spring to increase a distance between the insertion portions.

10. The bifocal-glasses frame according to claim 7, wherein
the connecting bar comprises a bent portion facing each of the lens-holding frames, and an outer-frame portion formed by bending each of opposite ends of the connecting bar downward,
the temples are each connected to the outer-frame portion at a level of a center of the first lens or a center of the second lens, and
a damper is provided between the outer-frame portion of the connecting bar and one of the lens-holding frames.

11. A bifocal-glasses frame comprising:
a pair of temples;
a connecting bar connecting respective ends of the pair of temples;
at least one hanging shaft located at a middle of the connecting bar;
nose pads fixed to the hanging shaft;
a slide attached to the hanging shaft for a sliding movement;
a pair of lens-holding frames arranged in front of the connecting bar with the slide being located therebetween so that the lens-holding frames are vertically slidable, the lens-holding frames being each configured to hold vertically arranged first and second lenses; and
a bridge coupling the lens-holding frames, wherein
opposite ends of the connecting bar are each bent downward forming an outer-frame portion, the outer-frame portion being configured to face an outer portion of corresponding one of the lens-holding frames,
the temples are each connected to the outer-frame portion of the connecting bar at a level of a center of the first lens or a center of the second lens, while the bridge is attached to the lens-holding frames at a level lower than the center of lower one of the first and second lenses,
a damper for each of the lens-holding frames is provided between the outer-frame portion of the connecting bar and the outer portion of corresponding one of the lens-holding frames, and
the lens-holding frames are slidable for a distance at least corresponding to a distance between a center of the first lens and a center of the second lens.

12. The bifocal-glasses frame according to claim 11, wherein
the slide comprises:
a slide bearing configured to receive the hanging shaft therein such that the slide bearing is slidable along the hanging shaft; a holder configured to hold the slide bearing at a predetermined position on the hanging shaft; and
a fall-stop provided to an end of the hanging shaft, and the holder comprises:
an engagement piece attached to the slide bearing; and
a spring for pressing the engagement piece against the hanging shaft.

13. The bifocal-glasses frame according to claim 11, wherein the slide comprises:
a clip body with a resilience enough to hold the hanging shaft; and
tabs for opening an end of the clip body.

14. The bifocal-glasses frame according to claim 11, wherein
the at least one hanging shaft comprises a pair of shafts, the pair of shafts being each provided with a fall-stop portion at a lower end thereof, and
the slide comprises:
sliding portions configured to receive the respective pair of shafts therein such that the sliding portions are slidable along the respective pair of shafts;
a flat spring with a resilience enough for the sliding portions to be held on the hanging shaft; and
operation tabs for opening the flat spring.

15. The bifocal-glasses frame according to claim 11, wherein
the hanging shaft is in a form of a polygonal column, and the slide comprises:
a slide bearing configured to receive the hanging shaft therein such that the slide bearing is slidable along the hanging shaft;
magnets configured to be attracted to respective upper and lower ends of the hanging shaft; and
sheet irons attached to respective upper and lower ends of the slide bearing.

16. The bifocal-glasses frame according to claim 11, wherein
the hanging shaft is in a form of a polygonal column, and the slide comprises:
a slide bearing configured to receive the hanging shaft therein such that the slide bearing is slidable along the hanging shaft;
two locking grooves provided to a surface of the slide bearing; and
locking pieces provided to respective upper and lower ends of the hanging shaft, the locking pieces being engageable with the respective locking grooves.

17. A bifocal-glasses frame comprising:
a pair of temples;
a connecting bar connecting respective ends of the pair of temples;
a shaft erected at a middle of the connecting bar;
nose pads fixed to the shaft;
a pair of lens-holding frames each configured to hold vertically arranged first and second lenses;
a bridge coupling the lens-holding frames at a level of a center of the lens-holding frames; and
a bearing configured to receive the shaft therein, the bearing being fixed at a middle of the bridge, wherein
the lens-holding frames are arranged in front of the connecting bar.

18. The bifocal-glasses frame according to claim 17, wherein the shaft is in a form of a polygonal column having an end provided with a resilient slot.

19. The bifocal-glasses frame according to claim 17, wherein
the connecting bar comprises a bent portion facing each of the lens-holding frames, and an outer-frame portion formed by bending each of opposite ends of the connecting bar downward,
the temples are each connected to the outer-frame portion at a level of a center of the first lens or a center of the second lens, and
a damper is provided between the outer-frame portion of the connecting bar and one of the lens-holding frames.

* * * * *